J. DUNN.
PINEAPPLE FLESHING MACHINE.
APPLICATION FILED FEB. 12, 1918.
1,271,868.
Patented July 9, 1918.
2 SHEETS—SHEET 1.
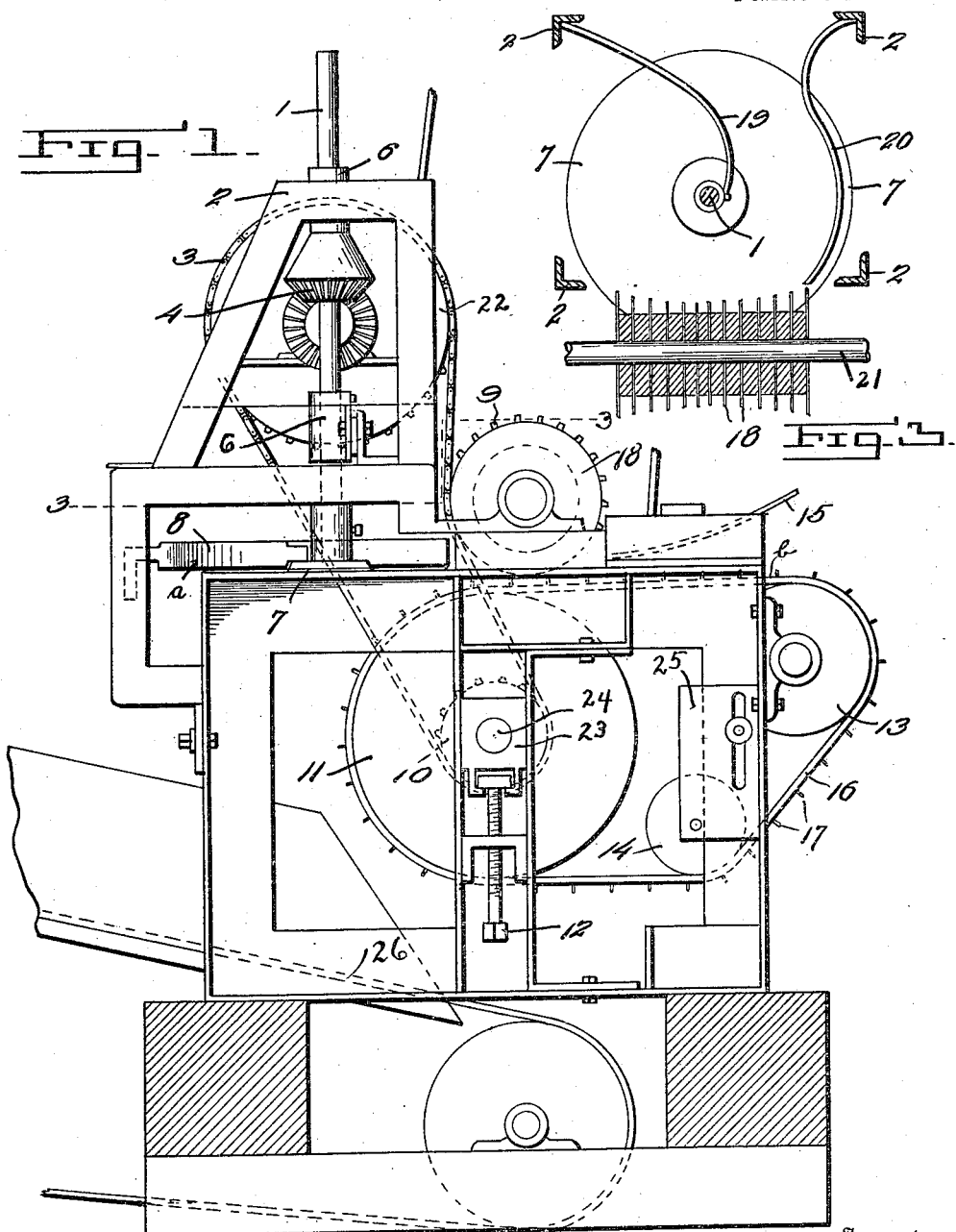
Inventor
John Dunn.
By Jerry A. Mathews,
Attorney
Witness

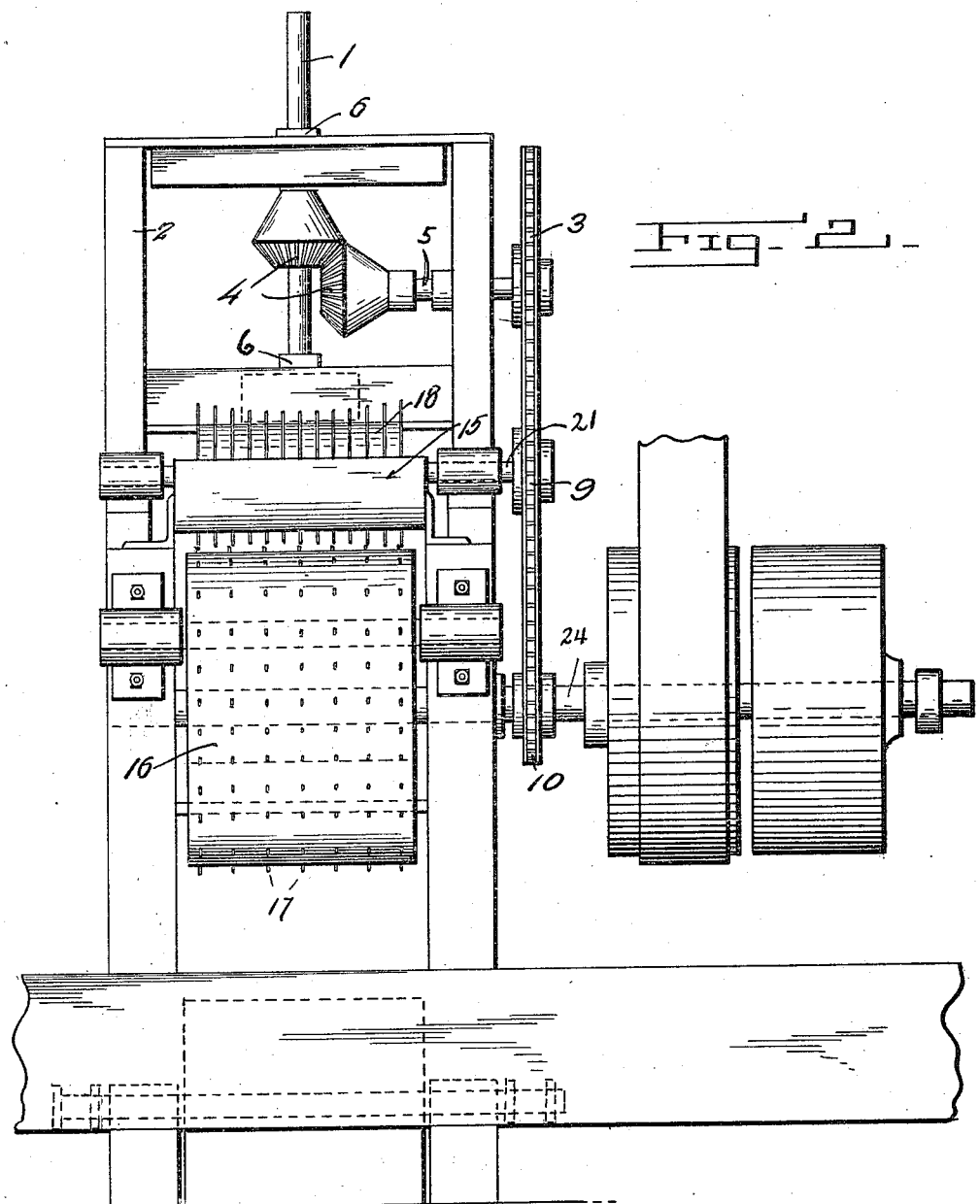

UNITED STATES PATENT OFFICE.

JOHN DUNN, OF HONOLULU, TERRITORY OF HAWAII.

PINEAPPLE-FLESHING MACHINE.

1,271,868.     Specification of Letters Patent.     Patented July 9, 1918.

Application filed February 12, 1918. Serial No. 216,763.

*To all whom it may concern:*

Be it known that I, JOHN DUNN, a citizen of the United States, residing at Honolulu, in the county of Honolulu and the Territory of Hawaii, have invented a new and useful Pineapple-Fleshing Machine, of which the following is a specification.

The object of my invention is to provide a machine to operate on the shells or peelings of pineapples after they have been received from the sizer machine and which will shave off the meat in a solid clean-cut condition instead of the messy and unsatisfactory condition which occurs when fleshing machines heretofore in use are employed.

I attain the object of my invention by the mechanism illustrated in the accompanying drawings in which—

Figure 1 is a side elevation of my improved machine;

Fig. 2 is an end elevation;

Fig. 3 is a section on line 3—3 of Fig. 1.

Like characters of reference designate like parts throughout the several views.

Referring to the accompanying drawings, in frame 2 is mounted the main shaft 24, which carries a sprocket 10. Sprocket 10 drives chain 3, which in turn drives sprocket 22. The latter sprocket is mounted on shaft 5, which, by means of bevel gears 4 operates the drive shaft 1, the latter being mounted in bearing 6.

A horizontal revolving disk blade 7 is secured to the lower end of shaft 1.

I provide a sprocket 9 which is driven by chain 3. Sprocket 9 is mounted on shaft 21. On shaft 21 are mounted spaced knife disks 18. These disks 18 are of varying size, as shown in Fig. 3, it being required that the outer disks shall be of slightly greater diameter than those nearest the center, the disks being suitably graduated in size for operating upon pineapple shells or peelings.

Extending across a portion of blade 7, are suitable guides 19, 20 for conducting the flesh of the pineapple from the blade.

Referring to Figs. 2 and 3, I provide a suitable upwardly curved guide 15 which holds any fleshed peelings flat. Mounted on suitable pulleys 11 and 13, and on an adjustable idler 14, is a suitable conveyer belt 16, having spikes 17 for the purpose of engaging the pineapple peelings. The tension of the conveyer belt is adjusted by idler 14 which is regulated by a suitable adjustable device 25, such as shown in Fig. 1. For the purpose of regulating the tension of belt 3, I provide a suitable adjusting screw 12, for adjusting the bearing in which shaft 24 is mounted.

I provide a suitable offset member 8, as shown in Fig. 1 for discharging from the machine the pineapple flesh cut from the skin or peelings.

In operating the machine, the pineapple skins or peelings as they come from the sizer machines in use at pineapple canneries, are fed by hand to conveyer-belt 16, at about the point designated $b$ in Fig. 1. Thence the skins are conveyed beneath the curved guide 15 to the revolving vertical, spaced cutting disks 18, by which the pineapple flesh is severed into strips. The pineapple peelings are, of course, carried with the skin side of the peel downward. The disks 18 revolve clockwise as viewed in Fig. 1, which facilitates the progress of the pineapple peelings. The revolving disks 18 cut the pineapple meat or flesh into strips of a uniform width without cutting into the rind and at the same time serve to hold the flesh flat before shaving off the skin or rind by the horizontal revolving disk blade 7.

The flat horizontal revolving blade 7 next operates upon the pineapple peelings, cutting or shaving off the strips from the rind or skins.

The recovered pineapple meat or flesh is carried around about 180 degrees, where it encounters an offset guide 19, which causes it automatically to fall from the blade 7 onto a suitable conveyer 26, at which point the function of this machine ends.

The pineapple flesh or meat is kept from scattering off the horizontal blade 7 by means of guide 20, as shown in Fig. 3.

The machine is power driven, as indicated in Figs. 2. Any suitable framework, shafts, pulleys, sprockets, belts, gears, bearings and the like, may be employed.

What I claim is:

1. In a pineapple fleshing machine, the combination of revolving spaced cutting disks arranged to cut the fleshy portion of pineapple peelings into strips, and a revolving cutting blade at right angles to the aforementioned disks to sever the strips from the skin.

2. In a pineapple fleshing machine, a horizontal revolving circular blade for severing the meat or flesh of pineapples from the skin, means for conveying the pineapple peelings to said blade, said means including spaced cutting disks arranged to cut the fleshy portion of the pineapple peelings into strips, and offset guide members positioned over the horizontal revolving blade to guide the recovered pineapple meat to a conveyer, substantially as set forth.

3. In a pineapple fleshing machine, the combination of conveying means, an upwardly curved guide, disposed above the conveyer belt, spaced vertical blades, the center blades being of smaller diameter than the outer blades; a horizontal revolving disk blade for severing the strips of pineapple from the peelings and means for conducting the flesh or meat of the pineapple into a receptacle separate from the skin.

JOHN DUNN.